United States Patent [19]
Deng et al.

[11] Patent Number: 5,994,859
[45] Date of Patent: Nov. 30, 1999

[54] TORSIONAL OSCILLATION COMPENSATION IN THE DRIVETRAIN OF A MOTOR VEHICLE

[75] Inventors: Doug D. Deng, Canton; Jack H. Xu, Troy; Mukunda V. Prema, Canton, all of Mich.

[73] Assignee: Ford Motor Company, Dearborn, Mich.

[21] Appl. No.: 08/848,206

[22] Filed: Apr. 30, 1997

[51] Int. Cl.⁶ .................................................. H02P 7/00
[52] U.S. Cl. ........................................ 318/432; 318/254
[58] Field of Search .................................. 318/139, 254, 318/811, 616, 432, 434, 439

[56] References Cited

U.S. PATENT DOCUMENTS

| | | | |
|---|---|---|---|
| 4,622,500 | 11/1986 | Budelman, Jr. | 388/811 |
| 5,426,354 | 6/1995 | Bausch | 318/254 |
| 5,444,346 | 8/1995 | Sudo et al. | 318/616 |
| 5,556,174 | 9/1996 | Wiss et al. | 303/191 |
| 5,610,483 | 3/1997 | Obara et al. | 318/139 |

*Primary Examiner*—Robert E. Nappi
*Assistant Examiner*—Rina I. Duda
*Attorney, Agent, or Firm*—Mark S. Sparschu

[57] ABSTRACT

The present invention provides a method for reducing torsional vibration in a vehicle drivetrain. The method comprises detecting a rotational speed of the drivetrain to generate a rotational speed signal. The method also includes generating a vibration compensating torque command which is a function of a frequency content of the rotational speed signal. The present invention further provides a system for reducing torsional vibration in a vehicle drivetrain. The system includes a source of torque, a drivetrain coupled to receive torque from the source of torque and a speed detector adapted to detect a rotational speed of the drivetrain and generate a rotational speed signal. The system additionally includes an electronic controller coupled to the source of torque and programmed to provide operational command signals to the source of torque. The system further comprises a frequency detector having an input and an output, the input coupled in electrical communication with the speed detector to receive the rotational speed signal and the output coupled in electrical communication with the electronic controller.

2 Claims, 2 Drawing Sheets

TORSIONAL OSCILLATION COMPENSATION IN THE DRIVETRAIN OF A MOTOR VEHICLE

BACKGROUND OF THE INVENTION

1. Field of the Invention

The present invention relates to compensation to reduce vibration in the drivetrain of a motor vehicle.

2. Description of the Related Art

In an electrically-propelled vehicle, a simple single-speed transmission can be used. Such a transmission can be used because, unlike an internal combustion engine, an electric motor can operate over a very wide rotational speed range. Thus, a multiple-speed transmission for converting from an internal combustion engine's relatively narrow speed range to a wider vehicle speed range is not necessary.

A single-speed transmission has several benefits, including simplicity, reliability and low cost. However, the gears of the transmission may be subject to "backlash", wherein the mating teeth of two gears (a driving gear and a driven gear) are not in contact when the driving gear begins to move. When such a backlash condition exists, the driving gear will accelerate quickly before its teeth are in contact with the teeth of the driven gear. The result can be a significant impact between the teeth of the gears when the teeth finally come into contact.

The impact can introduce a significant torsional oscillation into the vehicle's drivetrain, particularly at the drivetrain's torsional resonant frequency. The oscillation in turn can translate into customer dissatisfaction with the driveability of his vehicle.

Thus, a system which can reduce or eliminate backlash can improve customer satisfaction by reducing the resultant oscillation in the vehicle's drivetrain. Likewise, a system which can reduce the oscillation introduced by any backlash which may occur will also improve customer satisfaction.

SUMMARY OF THE INVENTION

The present invention provides a method for reducing torsional oscillation in a vehicle drivetrain coupled to a source of torque. The method comprises detecting a rotational speed of the drivetrain to generate a rotational speed signal. The method also includes bandpass filtering the rotational speed signal to generate a torque command having frequency components substantially only including a torsional resonant frequency range of the drivetrain. The method further comprises applying the torque command to the source of torque as a negative torque command to compensate for oscillation of the drivetrain at the resonant frequency.

Systems according to the present invention can substantially reduce the torsional vibration in a vehicle's drivetrain. Such reduction will considerably improve vehicle driveability, improving customer satisfaction.

DETAILED DESCRIPTION OF THE PREFERRED EMBODIMENT

Figure 1:
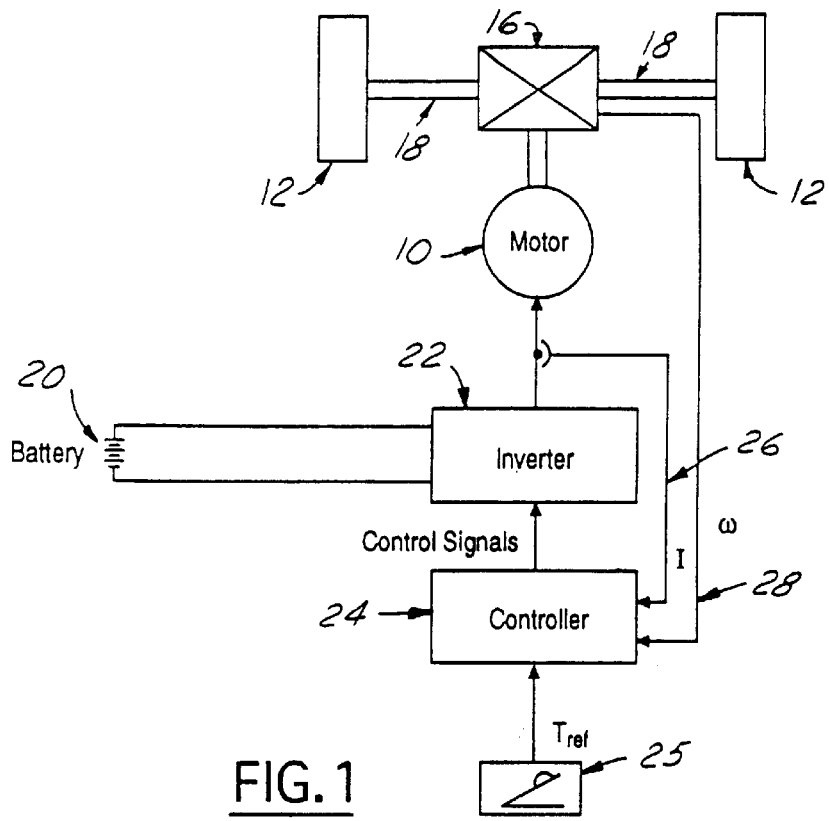
FIG. 1 is a block diagram of the powertrain and powertrain controls of an electrically-propelled vehicle.

Refer first to FIG. 1, where a block diagram of the powertrain and powertrain controls of an electric vehicle are illustrated. An electric motor 10 provides drive torque for the driving wheels 12 of the vehicle. Located between motor 10 and wheels 12 is a drivetrain which includes a transaxle 16 and driveshafts 18. Transaxle includes gearing selected to provide appropriate torque and rotational speed ratios between motor 10 and wheels 12.

A battery 20 provides electric power for motor 10. The DC power from battery 20 is converted to AC power, typically three-phase power, by inverter 22. An electronic controller 24 provides gating control signals for the switching devices in inverter 22. Electronic controller 24 also contains control logic for converting a torque demand, generated by a position of acceleration pedal sensor 25, into a current command for motor 10. Feedback signals to electronic controller 24 include actual motor current signal 26 and drivetrain rotational speed ($\omega$) 28. Appropriate sensors are provided to generate these feedback signals. Electronic controller 24 is preferably a microprocessor-based device having appropriate inputs, outputs, throughput, memory and the like to perform the functions ascribed to it herein.

Whereas a vehicle with an internal combustion engine typically has a multi-speed transmission to provide appropriate torque at all speeds, an electric vehicle can use a single-speed transmission. This is due to the mechanical simplicity of an electric motor and the motor's resultant ability to deliver required driving torque over a much wider speed range than an internal combustion engine. Thus, transaxle 16 is preferably a single-speed transaxle. Such a transaxle has the considerable advantages of simplicity, reliability and relatively low cost.

Figure 2A:
FIG. 2A illustrates two gears in a backlash condition.
Figure 2B:
FIG. 2B illustrates two gears in a zero-backlash condition.

Refer additionally now to FIGS. 2A and 2B. Where a relatively simple transmission such as transaxle 16 is used, a potential for "backlash" in the gears of the transmission is present. FIG. 2A shows a condition of backlash between a driving gear 27 and a driven gear 29. (The rotational direction of driving gear 27 is shown by an arrow on that gear.) When driving gear 27 begins to turn, it will accelerate prior to its teeth contacting the teeth of driven gear 29. The teeth of driving gear 27 can thus "slap" the engaged teeth of driven gear 29, introducing a relatively large impact into the drivetrain of the vehicle. The drivetrain may then torsionally oscillate at its resonant frequency.

In contrast to FIG. 2A, FIG. 2B shows a situation where no backlash exists. In order to substantially eliminate backlash and compensate for backlash should some backlash occur, the control system of FIG. 3 can be employed.

Figure 3:
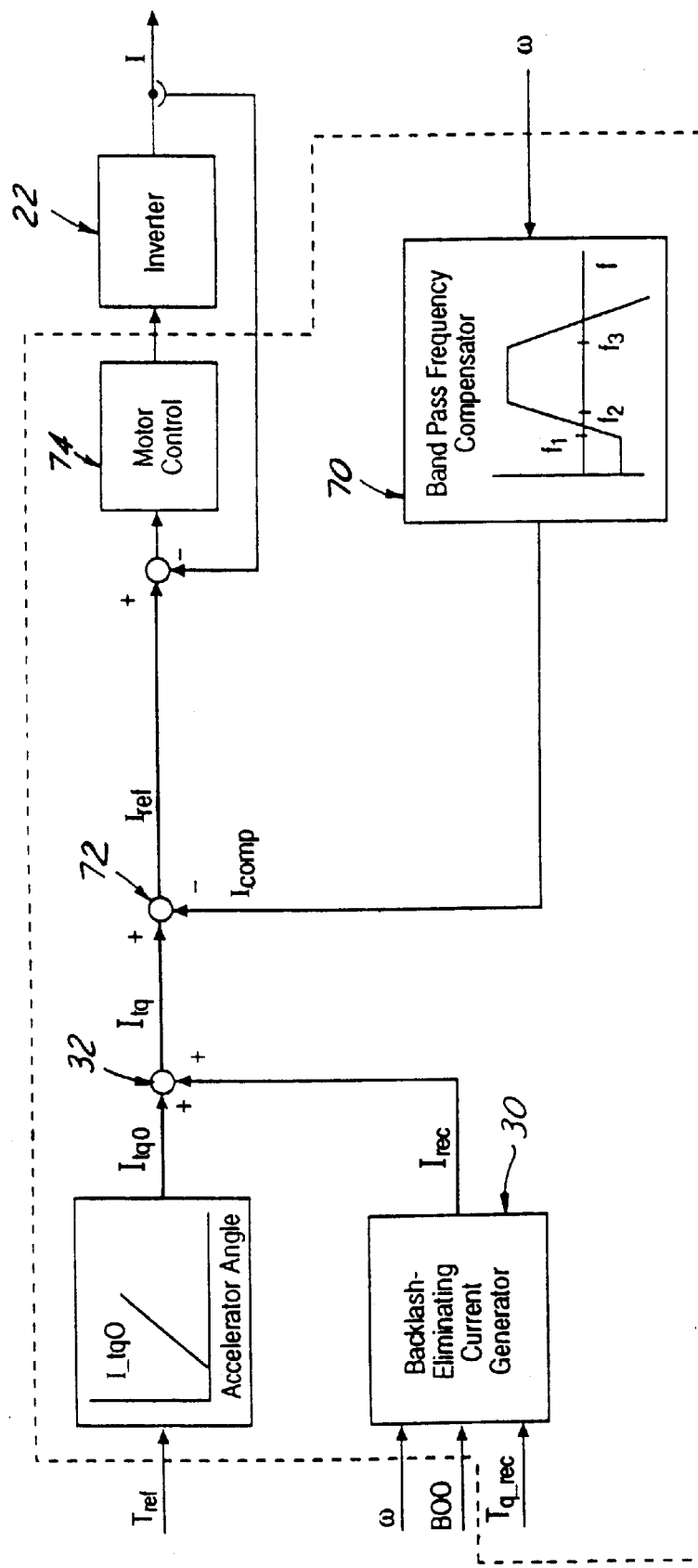
FIG. 3 provides further detail of electronic controller 24 of FIG. 1.

Refer now to FIGS. 1 and 3. Electronic controller 24 includes a backlash-eliminating current generator 30. Current generator 30 uses drivetrain rotational speed, brake on/off state and a predetermined backlash-eliminating reference torque as inputs and generates a backlash-eliminating current $I_{rec}$ as an output. Current $I_{rec}$ is added at summing block 32 to the current command $I_{tq0}$, which represents the torque commanded by the driver pressing on the accelerator pedal of the vehicle. The result is $I_{tq}$, a modified current command.

Figure 4:
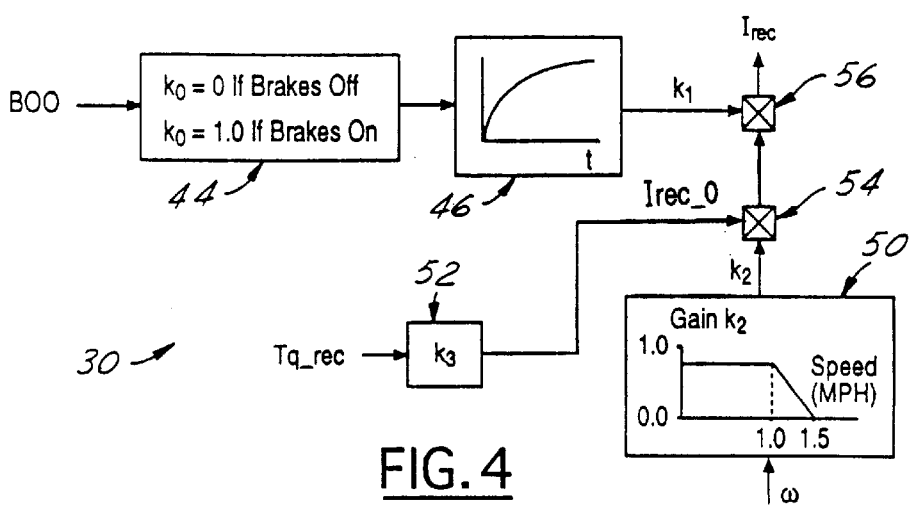
FIG. 4 provides further detail of backlash-elimination current generator 30 of FIG. 3.

Refer additionally to FIG. 4 for additional detail of current generator 30. Block 44 uses "brake on/off" (BOO) status derived from the brake switch of the vehicle. This can be either a discrete switch which simply gives ON/OFF status or an analog sensor which senses the amount that the brake pedal of the vehicle is depressed. The output of block 44 is a constant $k_0$, which has a value of 1.0 if the brakes are applied and 0 if the brakes are not applied. $k_0$ is then preferably low-pass-filtered at block 46, to result in a constant $k_1$.

Block 50 uses as an input vehicle speed or drivetrain rotational speed, derived from an appropriate sensor or encoder. (In a single-speed transmission, there is a unique and known relationship between drivetrain rotational speed and vehicle speed, making vehicle speed and drivetrain rotational speed interchangeable for this purpose. In a multi-speed transmission, the relationship is also known if knowledge of the present transmission gear ratio is known.) At block 50, a gain $k_2$ is determined. Gain $k_2$ is equal to 1.0 if vehicle speed is below a very low threshold (for example, one mile per hour) and decreases to zero as vehicle speed increases to another very low threshold (for example, one and one-half miles per hour).

At block 52, a very small predetermined backlash-eliminating torque value $T_{q-rec}$ (chosen to be much less than the braking capability of the vehicle's brakes) is multiplied by an appropriate constant $k_3$ to convert $T_{q-rec}$ into units of electrical current. The output of block 52 is a backlash-eliminating current value $I_{rec-0}$. $I_{rec-0}$ is then multiplied by $k_2$ at block 54 and by $k_1$ at block 56.

The result of the calculations at blocks 54 and 56 is backlash-eliminating current command $I_{rec}$, which is applied as illustrated in FIG. 3. The calculations illustrated in FIG. 4 are such that $I_{rec}$ is zero except when the brakes of the vehicle are applied and the vehicle's speed is extremely low. $I_{rec}$ provides torque which is just sufficient to keep the meshed gear teeth of transaxle 16 in contact, but not large enough to propel the vehicle. Due to the inclusion of $I_{rec}$, the gear teeth in the drivetrain do not slap together with great impact at launch of the vehicle from rest. Drivetrain oscillations which might otherwise occur are therefore substantially prevented.

However, to the extent that some backlash does occur, a compensator included in this embodiment of the present invention will eliminate any oscillation which is introduced into the drivetrain. Refer again to FIG. 3. Compensator 70 uses as an input drivetrain rotational speed, acquired from an appropriate sensor. Compensator 70 is a bandpass filter with a passing frequency band ($f_1$ to $f_2$) which includes the torsional resonant frequency of the drivetrain of the vehicle. Thus, an oscillation-compensating current $I_{comp}$ is generated only when the drivetrain rotational speed has a frequency component around the torsional resonant frequency of the drivetrain. At higher frequencies (the frequencies where high-frequency performance of the original system is desired), compensator 70 will have no effect. None of those frequency components will pass.

The preferred transfer function of compensator 70 is:

$$G(s) = \frac{G_1(s + \omega z_1)}{(s + \omega p_1)(s + \omega p_2)},$$

Gain $G_1$, zero $z_1$ and poles $P_1$, and $P_2$ are selected to provide the transfer function illustrated in block 70 of FIG. 3.

The output of compensator 70, $I_{comp}$ is combined with $I_{tq}$ at summing node 72. $I_{ref}$, the output of summing node 72, is provided to motor control block 74. Motor control block 74 represents any conventional motor control scheme. Motor control block 74 controls the switching of inverter 22 (selected from any appropriate conventional inverter design) to generate current I for motor 10 (FIG. 1). Current I is fed back to motor control block 74 (as is also conventional), so current I can be controlled to equal $I_{ref}$.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for reducing torsional oscillation in a vehicle drivetrain coupled to a source of torque, said method comprising:

(a) detecting a rotational speed of said drivetrain to generate a rotational speed signal;

(b) bandpass filtering said rotational speed signal to generate a bandpass filtered signal having frequency components substantially only including a torsional resonant frequency range of said drivetrain; and (c) combining said bandpass filtered signal as a negative torque command with a torque command derived from an accelerator pedal input, to generate a modified torque command; and (d) applying said modified torque command to said source of torque.

2. A method as recited in claim 1, wherein said source of torque is an electric motor.

* * * * *